(12) United States Patent
Holms

(10) Patent No.: US 7,806,753 B2
(45) Date of Patent: Oct. 5, 2010

(54) SKIN-ON HAM DEBONING METHOD

(75) Inventor: Donald D. Holms, West Des Moines, IA (US)

(73) Assignee: Stork Townsend Inc., Des Moines, IA (US)

( * ) Notice: Subject to any disclaimer, the term of this patent is extended or adjusted under 35 U.S.C. 154(b) by 50 days.

(21) Appl. No.: 12/029,592

(22) Filed: Feb. 12, 2008

(65) Prior Publication Data

US 2009/0203304 A1 Aug. 13, 2009

(51) Int. Cl.
*A22C 17/00* (2006.01)

(52) U.S. Cl. .................. 452/137; 452/125; 452/132; 452/135

(58) Field of Classification Search .................. 452/125, 452/132, 133, 135, 137
See application file for complete search history.

(56) References Cited

U.S. PATENT DOCUMENTS

| | | | | |
|---|---|---|---|---|
| 511,927 A | * | 1/1894 | Brendon | 452/136 |
| 1,435,877 A | * | 11/1922 | Reubold | 452/136 |
| 2,419,424 A | * | 4/1947 | Staab | 452/136 |
| 2,857,619 A | * | 10/1958 | Massengill | 452/136 |
| 2,893,051 A | * | 7/1959 | Massengill | 452/136 |
| 3,644,963 A | * | 2/1972 | Terranova | 452/135 |
| 3,766,604 A | * | 10/1973 | Lunn et al. | 452/187 |
| 4,525,896 A | * | 7/1985 | Leining et al. | 452/148 |
| 5,108,344 A | * | 4/1992 | Debey | 452/135 |
| 5,226,850 A | * | 7/1993 | Klaassen | 452/171 |
| 5,462,477 A | * | 10/1995 | Ketels | 452/135 |
| 5,542,879 A | * | 8/1996 | Kunig et al. | 452/135 |
| 5,597,351 A | * | 1/1997 | Queally et al. | 452/135 |
| 5,667,436 A | * | 9/1997 | Gagliardi, Jr. | 452/149 |
| 5,713,787 A | * | 2/1998 | Schoenmakers et al. | 452/136 |
| 5,961,383 A | * | 10/1999 | Janssen et al. | 452/135 |
| 6,106,384 A | * | 8/2000 | Mutoh et al. | 452/135 |
| 7,198,564 B2 | * | 4/2007 | Hino et al. | 452/135 |
| 7,214,403 B1 | * | 5/2007 | Peters | 426/641 |
| 7,232,365 B2 | * | 6/2007 | Annema et al. | 452/167 |

OTHER PUBLICATIONS

Pork.org Porcine Myology; List of Porcine Videos; http://porcine.unl.edu/porcine2005/pages/index.jsp?what=porcineVideoList; Nov. 21, 2007; pp. 1-7.

* cited by examiner

*Primary Examiner*—David J Parsley

(57) ABSTRACT

A method for the skin-on deboning of a ham prior to processing in a conventional skinner. The ham is deboned and the inside musculature, outside musculature, knuckle musculature and inner shank musculature are removed prior to the removal of skin and fat from the various cuts.

2 Claims, 5 Drawing Sheets

SKIN-ON HAM DEBONING METHOD

BACKGROUND OF THE INVENTION

This invention is directed toward a method of deboning and skinning a ham and more particularly a method of deboning a ham prior to removing the skin and fat.

Methods of deboning and skinning a ham are well known in the art. Typically, as an initial step, an individual removes an initial layer of skin and fat using a skinning machine. Once skinned, the individual would place the ham, weighing generally 20-25 lbs. on a conveyor. The continuous lifting and skinning exposes this individual to fatigue and potential injury. Once placed on the conveyor, initially three to five individuals, working with circular knives or the like would remove additional fat prior to deboning. Sometimes, when manually removing additional fat, individuals would cut too deep, reducing yield. Based on this situation, a need exists in the art for a method that addresses these deficiencies.

A principal object of the invention is to provide a method for deboning a ham that will achieve improved efficiency and savings in time and labor.

A further object of the invention is to provide a method for deboning a ham that is safe and capable of being performed by meat processing personnel with minimal training.

Yet another object of the invention is to provide a method for deboning a ham that maximizes yield, including skins and saleable trim, and minimizes waste.

BRIEF SUMMARY OF THE INVENTION

A method for skin-on deboning a ham prior to processing the same in a conventional, skinning machine. Whereas in the prior art, a ham was skinned before being deboned and separated, in the instant method, the ham is deboned and separated prior to the removal of skin and fat.

A ham is removed from a carcass in any conventional manner. The knuckle bone, shank bones, aitch bone and shank musculature are pulled. The inside musculature is opened along the knuckle seam and pulled along its natural seam with the outside musculature. Knuckle musculature is pulled away by pulling the femur, rolling the knuckle musculature away from the false lean portion, and lifting the tender tip.

The false lean portion, knuckle plate and dark and light butts are lifted. The inner shank musculature is pulled and the tendon tips are trimmed. The hamstring muscle is opened and the lymph gland lifted. Membranes are removed from the inside musculature, the knuckle musculature, the outside musculature and the inner shank musculature, and the same are skinned using a conveyorized skinning machine.

DETAILED DESCRIPTION OF THE PREFERRED EMBODIMENT

Figure 1:
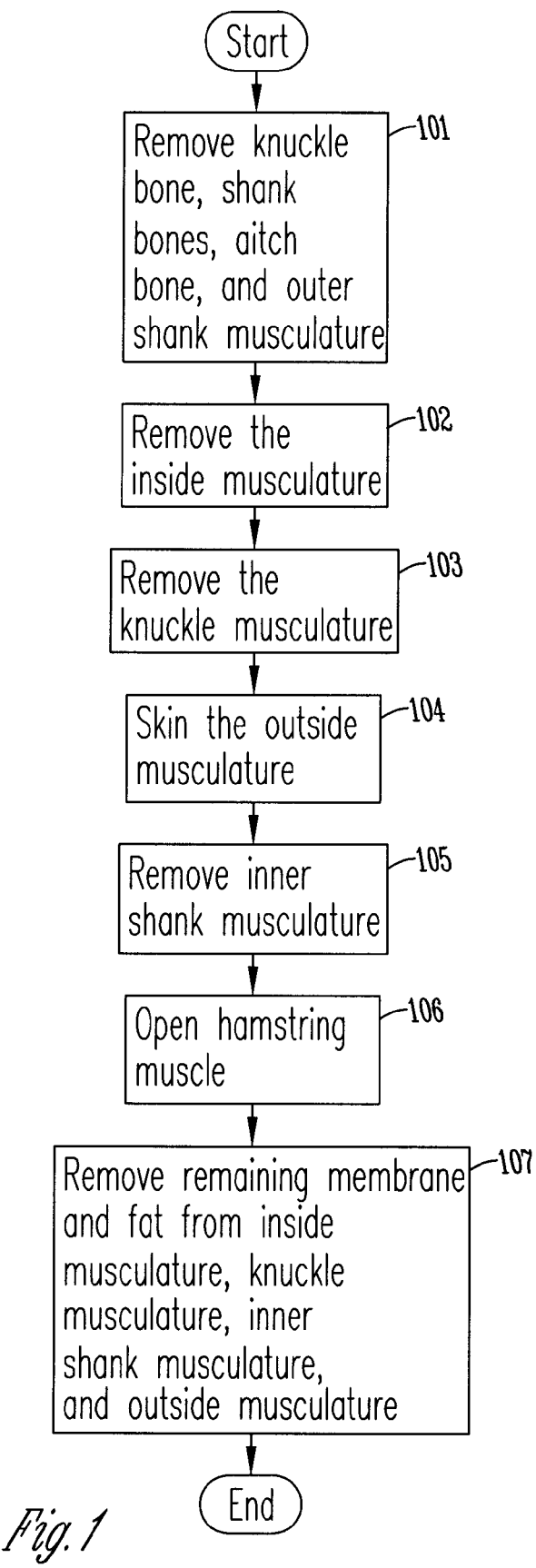
FIG. 1 is a schematic flow diagram of a method disclosed herein.

The embodiments discussed herein are merely illustrative of specific manners in which to use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Certain anatomical structures are known by a variety of names, depending for example on whether the usage is in the animal sciences or the food processing industry. No attempt is hereby made to exhaustively identify these possibilities, but persons of skill in the art will appreciate the structures and relationships described herein. Furthermore, while porcine (pig) anatomy is generally described, this disclosure is not intended to be limited in applicability to any particular genus or species of animal.

As used herein, "ham" shall refer to the haunch or that portion of the leg defined generally by the hip and thigh. Preferably, a porcine leg is separated from the side by a straight cut approximately perpendicular to a line parallel to the shank bones. The cut passes through a point which is not less than 1.5 inches (3.8 cm) and not more than 3.5 inches (8.8 cm) from the anterior edge of the aitch bone. The foot is removed from the leg at or slightly above the hock joint. The tail, vertebrae, rectus abdominis, flank muscle, cutaneous trunci, prefemoral lymph gland, and any other exposed lymph glands have preferably been removed from the ham prior to processing.

"Knuckle" herein shall refer to that portion of the ham commonly known as the knuckle, including one or more of the knuckle bone, knuckle seam, knuckle plate and knuckle musculature, as well as related anatomical structures.

"Knuckle bone" herein shall include portions of the knuckle bone (also known as the calcaneus or hock joint), the extent of which is present again depending on how the ham has been separated from the leg portion.

"Shank bones" herein shall include portions of the hind shank bones (also known as the tibia/fibula, rear leg bone, or hock bone), the extent of which is present depending on how the ham has been separated from the leg portion.

"Shank musculature" herein shall include one or more of the muscles of the porcine shank, including the gastrocnemius and soleus. Shank musculature is also defined in terms of inner shank musculature and outer shank musculature.

"Aitch bone" herein shall include portions of the aitch bone (also known as pelvic bone or ischium), as well as related or associated anatomical structures the presence or extent of which may vary depending upon the precise nature and location of the cuts by which the ham is separated from the carcass.

"Inside musculature" herein shall include one or more of the inside muscles of the porcine leg, including the semimembranosus and related structures.

"Knuckle musculature" herein shall include one or more of the muscles of the porcine knuckle, including the tensor fasciae latae and quadriceps group.

"Outside musculature" herein shall include one or more of the outside muscles of the porcine leg, including the biceps femoris, gluteus superficialis and semitendinosus.

"Plate" herein shall refer to the skin-and-fat plate removed from a portion of the ham. Inside plate refers to the plate covering the inside musculature. Knuckle plate refers to the plate covering the knuckle. Outside plate refers to the plate covering the outside musculature.

Referring to the Figures, a ham 10 is separated from a carcass (not shown) using any number of conventional means. Optionally, ham 10 may be delivered to a work station via a conveyor (not shown), which may be a suspended conveyor utilizing a plurality of hooks or a platform conveyor. Ham 10 is covered by skin 12 and a layer of subcutaneous fat 14 collectively known as a plate.

Figure 2:
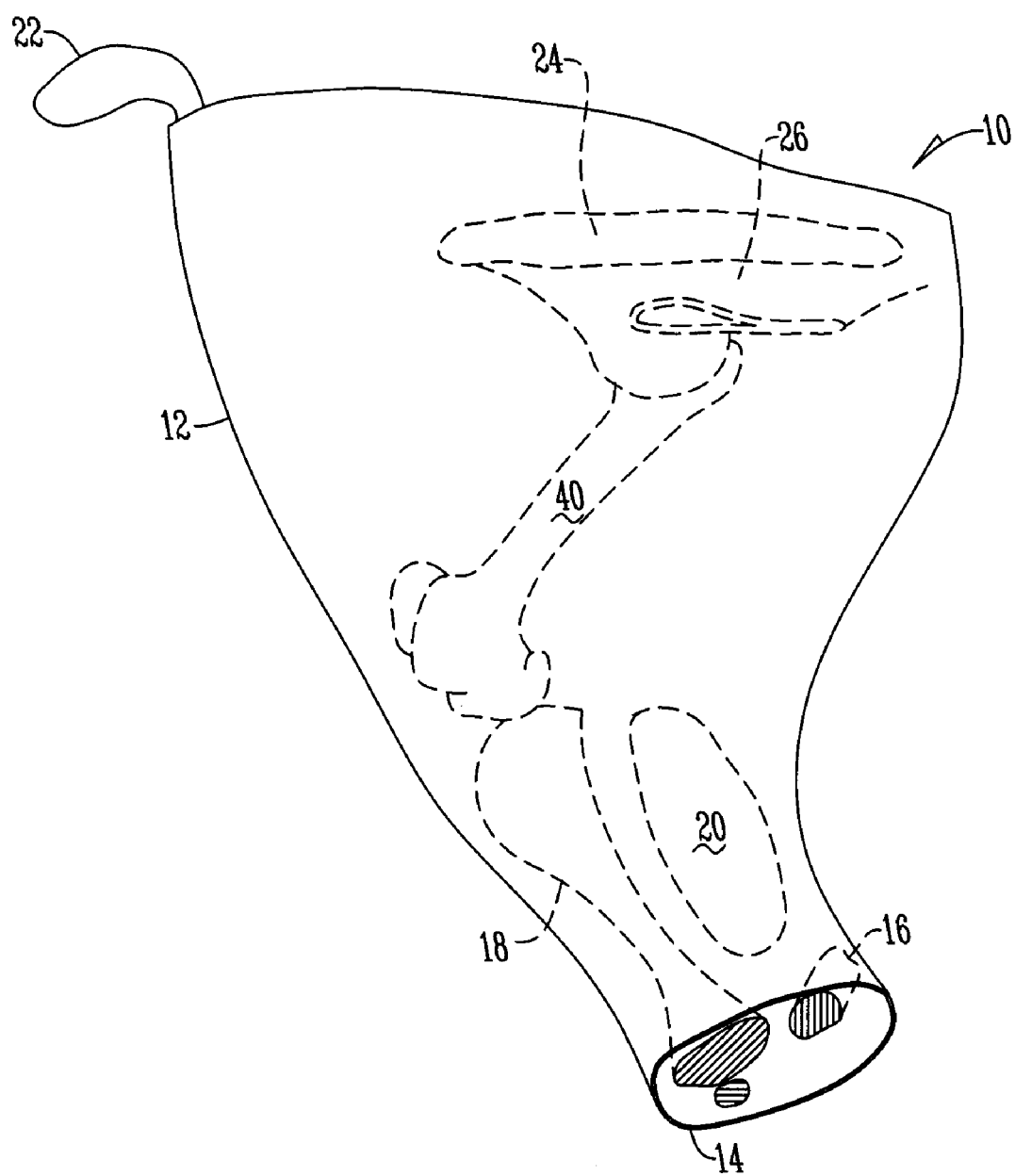
FIG. 2 is a partial cutaway schematic diagram depicting a ham being processed according to the method disclosed herein.

Referring to FIGS. 1 and 2, in step 101, the knuckle bone 16, shank bones 18, and outer shank musculature 20 are lifted away using conventional cutting techniques. Ham 10 may need to be sliced open along the longitudinal axis of shank bones 18 in order to permit their removal. Belly flap 22, if present, is also removed. Finally, aitch bone trim 24 is removed to permit removal of aitch bone 26 by conventional cutting techniques.

Figure 3:
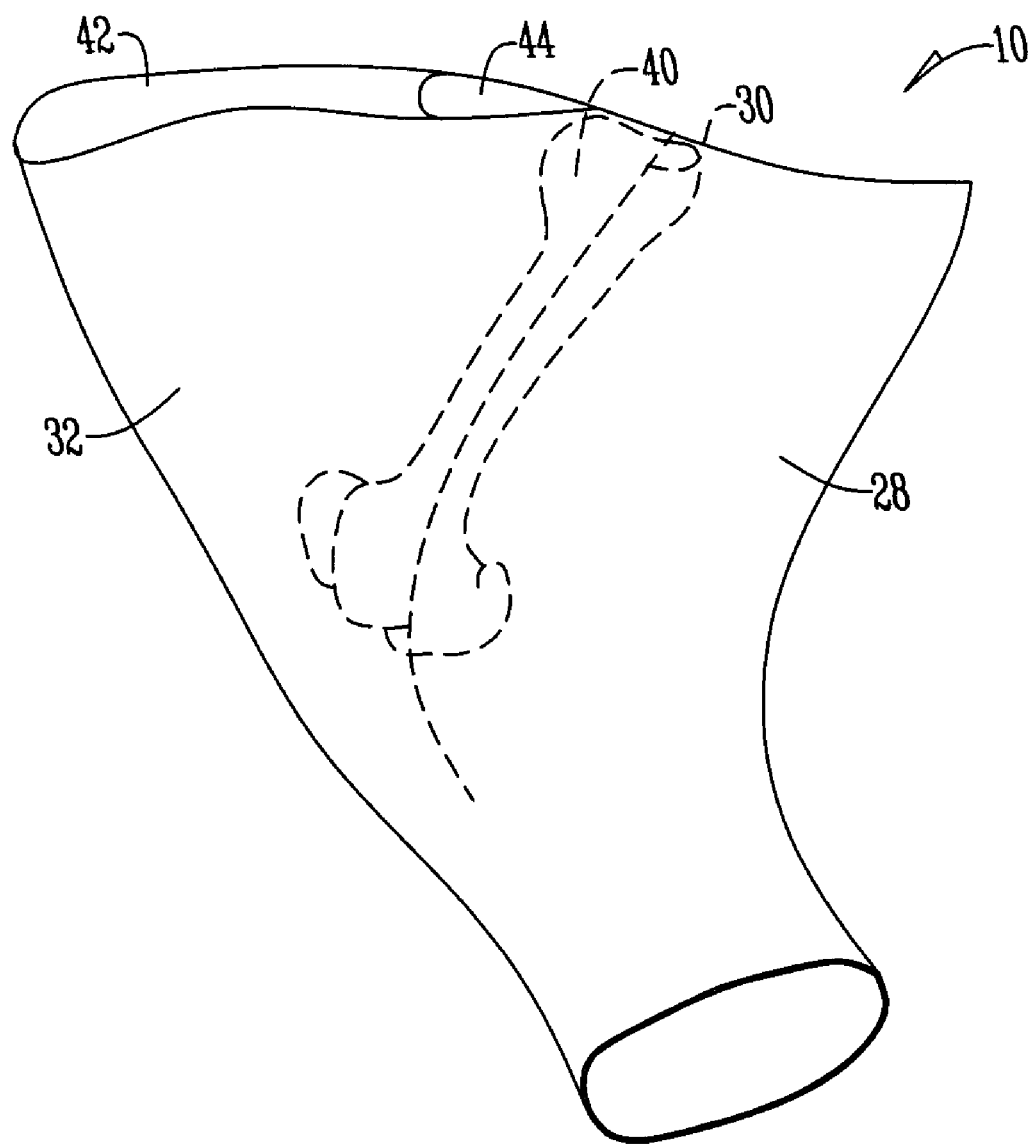
FIG. 3 is a partial cutaway schematic diagram depicting a ham being processed according to the method disclosed herein.

In step 102, turning to FIG. 3, inside musculature 28 is removed by cutting along knuckle seam 30, which separates inside musculature 28 from knuckle musculature 32. The inside musculature 28 is pulled along its natural seam with outside musculature 36. Natural seam is typically defined by a membrane disposed between the inside 28 and outside 36 musculature. Inside musculature 28 is removed completely by cutting through skin 12 and fat 14 where they meet natural seam 34.

Figure 4:
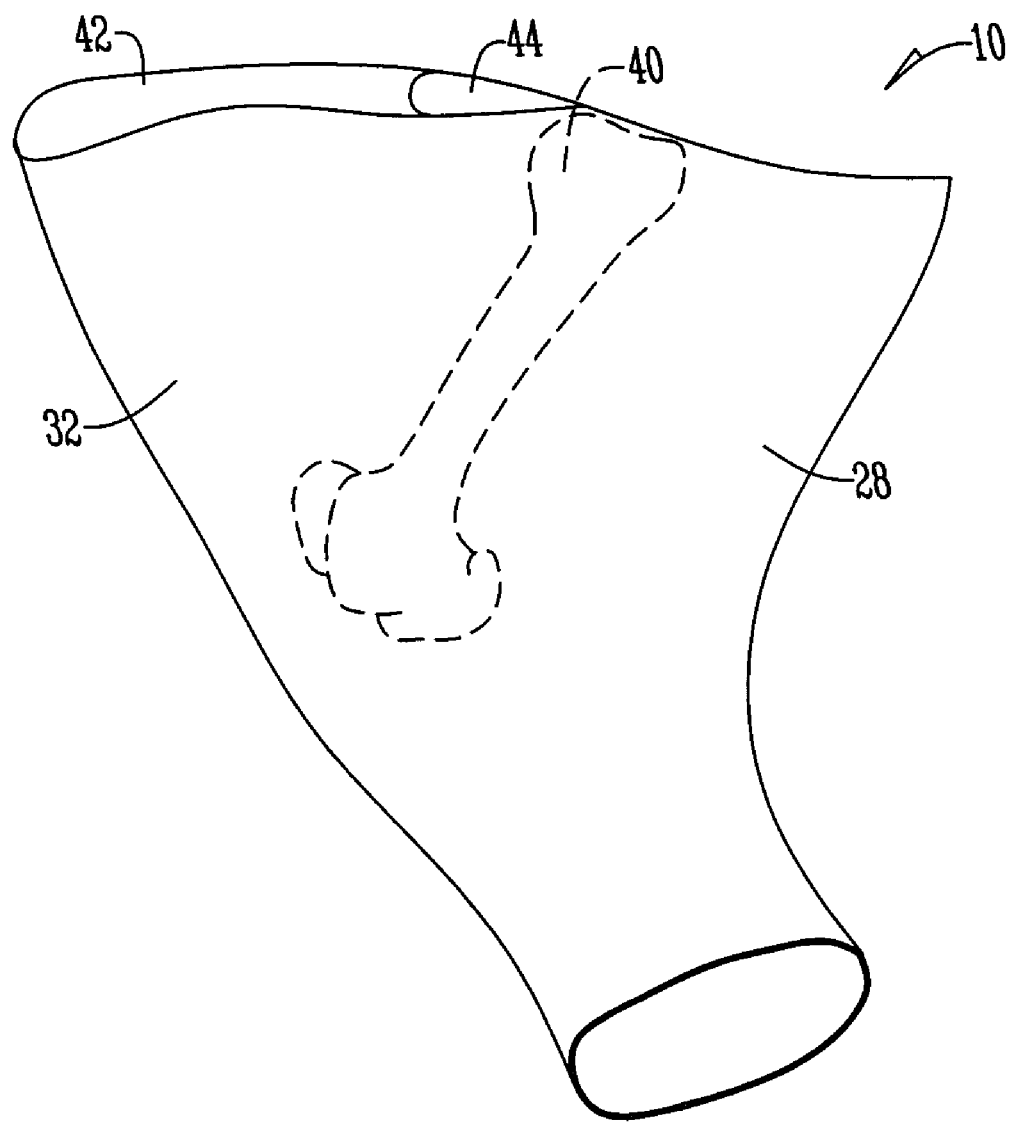
FIG. 4 is a partial cutaway schematic diagram depicting a ham being processed according to the method disclosed herein.

Referring to FIGS. 3 and 4, in step 103, the knuckle musculature 32 is removed. First, the femur 40 is separated from knuckle musculature 32. Then, knuckle musculature 32 is rolled away from the false lean 42 and the tender tip 44 is removed.

In step 104, the outside musculature 36 is skinned by removing the false lean 42, the skin/fat knuckle plate 43, and the layer of skin 12 and fat 14 on the outside musculature 36. The dark butt 46 and light butt 48 are also removed at this time. The layer of skin 12 and fat 14 on the outside musculature is removed by a skinning machine, a circular knife, a straight knife, or a combination thereof.

Figure 5:
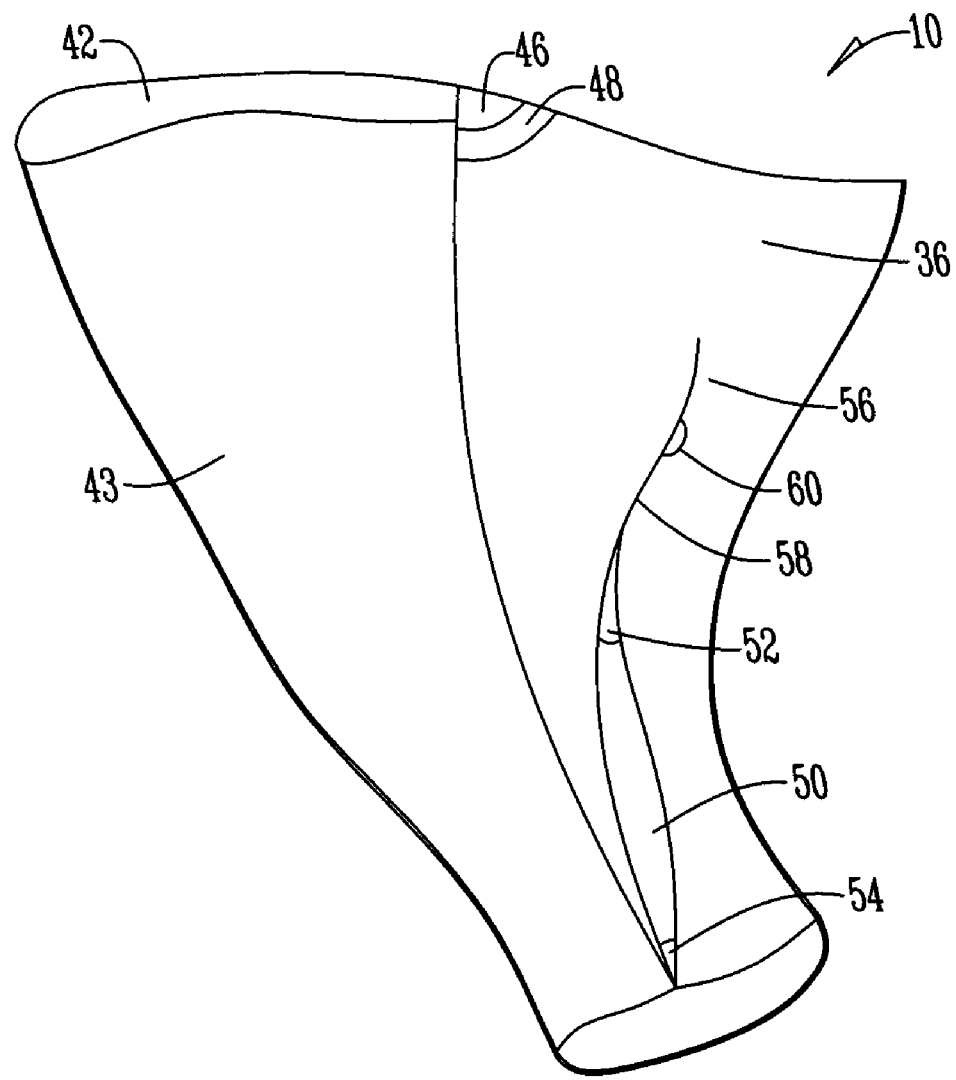
FIG. 5 is a partial cutaway schematic diagram depicting a ham being processed according to the method disclosed herein.

Turning to FIG. 5, at step 105, inner shank musculature 50 is pulled and tips 52 of tendon 54 are trimmed away using conventional cutting means.

At step 106, hamstring muscle 56 of ham 10 is opened along natural seam 58. The popliteal lymph gland 60 is then lifted.

At step 107, any remaining membrane 38 and fat 14 is removed from inside musculature 28 (separated at step 102), knuckle musculature 32 (separated at step 103), inner shank musculature 50 (separated at step 105) and outside musculature 36 using a skinning machine. Any conventional, conveyorized skinner machine, such as a Townsend® Model 9000H (STORK TOWNSEND, INC., Des Moines, Iowa), may be used. Alternatively, cuts such as knuckle musculature 32 may be butterflied via conventional cutting means.

Thus, provided is a method of deboning a ham prior to removing the skin and fat. By deboning the ham prior to removing the skin and fat the manual removing of additional fat prior to deboning is eliminated. By eliminating this step workers incur less fatigue and the possibility of human error, such as cutting the ham too deep, is reduced resulting in increased yields. Therefore, provided is a method of deboning a ham that is safe and capable of being performed by meat processing personnel with minimal training. The method also maximizes yield, including skins and saleable trim, and minimizes waste. As a result at the very least all of the stated objectives have been met.

Whereas, the present invention has been described in relation to the drawings attached hereto, it should be understood that other and further modifications, apart from those shown or suggested herein, may be made within the spirit and scope of this invention.

What is claimed is:

1. A method of deboning a skin-on ham prior to removing the skin, comprising the steps of:
    removing a knuckle bone, a shank bone, an aitch bone, and a shank musculature;
    removing an inside musculature by cutting along a knuckle seam and separating the inside musculature from an outside musculature along a natural seam;
    removing a knuckle musculature by pulling a femur, rolling the knuckle musculature away from a false lean, and lifting a tender tip;
    lifting the false lean portion, a knuckle plate, and dark and light butts from the outside musculature;
    pulling an inner shank musculature and trimming tendon tips from the inner shank musculature; and
    opening a hamstring muscle and lifting a gland.

2. A method of deboning a skin-on ham prior to skinning comprising steps of:
    removing a knuckle bone, a shank bone, an aitch bone, and a shank musculature;
    removing an inside musculature by cutting along a knuckle seam and separating the inside musculature from an outside musculature along a natural seam;
    removing a knuckle musculature by pulling a femur, rolling the knuckle musculature away from a false lean, and lifting a tender tip;
    lifting the false lean portion, a knuckle plate, and dark and light butts from the outside musculature;
    pulling an inner shank musculature and trimming tendon tips from the inner shank musculature; and
    opening the hamstring muscle and lifting a gland; and
    removing remaining skin, fat and membranes from the inside musculature, the knuckle musculature, the outside musculature and the inner shank musculature.

* * * * *